United States Patent
Boutillier et al.

(10) Patent No.: US 10,927,210 B2
(45) Date of Patent: Feb. 23, 2021

(54) POLYMERIC COMPOSITION COMPRISING AND RELEASING AN ODORIFEROUS ACTIVE COMPOUND

(71) Applicant: Arkema France, Colombes (FR)

(72) Inventors: Jean-Marc Boutillier, Sauvagnon (FR); Sylvain Bourrigaud, Morlanne (FR)

(73) Assignee: Arkema France, Colombes (FR)

( * ) Notice: Subject to any disclaimer, the term of this patent is extended or adjusted under 35 U.S.C. 154(b) by 226 days.

(21) Appl. No.: 15/034,698

(22) PCT Filed: Nov. 6, 2014

(86) PCT No.: PCT/EP2014/073982
§ 371 (c)(1),
(2) Date: May 5, 2016

(87) PCT Pub. No.: WO2015/067722
PCT Pub. Date: May 14, 2015

(65) Prior Publication Data
US 2016/0264704 A1    Sep. 15, 2016

(30) Foreign Application Priority Data

Nov. 6, 2013 (FR) ...................................... 1360878

(51) Int. Cl.
| | |
|---|---|
| C08F 293/00 | (2006.01) |
| A01N 25/10 | (2006.01) |
| C11B 9/00 | (2006.01) |
| A01N 37/44 | (2006.01) |
| C08K 5/18 | (2006.01) |
| C08F 297/02 | (2006.01) |
| C08L 53/00 | (2006.01) |
| C08L 33/12 | (2006.01) |
| C08K 5/101 | (2006.01) |

(52) U.S. Cl.
CPC ............ *C08F 293/00* (2013.01); *A01N 25/10* (2013.01); *A01N 37/44* (2013.01); *C08F 293/005* (2013.01); *C08F 297/026* (2013.01); *C08K 5/18* (2013.01); *C08L 33/12* (2013.01); *C08L 53/00* (2013.01); *C11B 9/0061* (2013.01); *C08K 5/101* (2013.01)

(58) Field of Classification Search
CPC ........ C08L 53/00; C08L 33/12; C08F 220/14; C08F 297/026
See application file for complete search history.

(56) References Cited

U.S. PATENT DOCUMENTS

| | | | | |
|---|---|---|---|---|
| 5,849,310 A | * | 12/1998 | Trinh | A61K 8/02 424/401 |
| 7,708,982 B2 | * | 5/2010 | O'Leary | A01M 1/2055 424/76.1 |
| 8,013,062 B2 | * | 9/2011 | Ruzette | C08F 293/00 525/71 |
| 8,461,098 B2 | | 6/2013 | Guerret | |
| 9,296,854 B2 | | 3/2016 | Bourrigaud | |
| 2004/0253285 A1 | | 12/2004 | O'Leary | |

FOREIGN PATENT DOCUMENTS

| | | | | |
|---|---|---|---|---|
| WO | 0040628 | | 7/2000 | |
| WO | WO 00/40628 | * | 7/2000 | ............ C08F 265/04 |
| WO | 2003062293 | | 7/2003 | |
| WO | 2008146119 | | 12/2008 | |
| WO | 2012085487 | | 6/2012 | |
| WO | 2013092958 | | 6/2013 | |

OTHER PUBLICATIONS

Steinwall (Polymethy-methacrylate 2016; http://www.steinwall.com/wp-content/uploads/2016/05/Polymethyl-methacrylate-PMMA.pdf).*
Polymerdatabase Properties (Crow 2015; http://polymerdatabase.com/polymer%20physics/Polymer%20Density.html).*
Gent (Elastomer Chemical Compound, Britannica, Molecular Branching, 2017 https://www.britannica.com/science/elastomer).*
(National Pesticide Information Center 2016 http://npic.orst.edu/envir/watersol.html).*
International Search Report and Written Opinion for International Application No. PCT/EP2014/0733982, dated Jan. 21, 2015, 7 pages.
Final Office Action for U.S. Appl. No. 15/552,042, dated Nov. 8, 2019, 10 pages.
Notice of Allowance for U.S. Appl. No. 15/552,042, dated Jun. 23, 2020, 11 pages.
Notice of Allowance for U.S. Appl. No. 15/552,042, dated Mar. 16, 2020, 7 pages.

\* cited by examiner

*Primary Examiner* — Anna R Falkowitz
(74) *Attorney, Agent, or Firm* — RatnerPrestia

(57) ABSTRACT

The present invention relates to a composition comprising a polymeric elastomeric phase and an odoriferous active compound. In particular the present invention relates to a composition comprising a polymeric elastomeric phase and an odoriferous active compound and releasing said odoriferous active compound over a given period of time. The present invention concerns also objects comprising a polymeric elastomeric phase and an odoriferous active compound and releasing said odoriferous active compound over a given period of time.

20 Claims, No Drawings

POLYMERIC COMPOSITION COMPRISING AND RELEASING AN ODORIFEROUS ACTIVE COMPOUND

This is the national phase of International Application No. PCT/EP2014/073982, filed 6 Nov. 2014, which claims priority from French Application No. 1360878, filed 6 Nov. 2013. The disclosure of each of these applications is incorporated herein by reference in its entirety for all purposes.

FIELD OF THE INVENTION

The present invention relates to a composition comprising a polymeric elastomeric phase and an odoriferous active compound.

In particular the present invention relates to a composition comprising a polymeric elastomeric phase and an odoriferous active compound and releasing said odoriferous active compound over a given period of time.

The present invention concerns also objects or articles comprising a polymeric elastomeric phase and an odoriferous active compound and releasing said odoriferous active compound over a given period of time.

Technical Problem

It is of great interest to have polymeric compositions or certain articles or objects made of polymeric compositions with a specific chosen odor. The odor of these polymeric compositions or certain articles shall not be only present at the beginning, but last a long time, in other words having a long lasting effect in terms of scenting. The characteristic chosen odor should be released over a given period of time.

The objective of the present invention is to provide a polymeric composition with an odor.

A further objective of the present invention is to provide a polymeric composition with an odor that can be scented for an extended length of time.

Still a further object of the present invention is to provide a composition with the means of modulating the release of an odor.

Still another object of the present invention is to have a transformable polymeric composition with an odor or to produce an object comprising a polymeric composition with an odor.

Another objective of the present invention is an object that can release an odor that can be scented for an extended length of time.

Again still another objective of the present invention is altering the rate of evaporation of the of the specific odorant ingredient in a polymeric composition.

BACKGROUND OF THE INVENTION

Prior Art

The document WO2013/092958 describes core shell capsules comprising a polymeric shell and encapsulating a perfume containing oil core. The core shell capsule has to be ruptured in order to release the perfume.

The document US2004/0253285 discloses gels for dispensing active volatile compounds. One component of the gel is a thermoplastic elastomer which is a polyether-ester-amide, which comprises semi-crystalline structures and blocks.

The document WO 00/40628 discloses branched/block copolymers for treatment of keratinous substrates. The blockcopolymer consists of a hydrophilic block and a hydrophobic block. The blockcopolymer is soluble in water.

The document WO2008/146119 describes a method for formulating odoriferous active ingredients in order to protect the same and to increase the persistence thereof. The method comprises the use of acrylic and thickening emulsions and especially the use of an hydrophobically alkali swellable emulsion.

In the prior art only polymeric particles, water soluble blockcopolymers or semicrystaline elastomers are described, that contain a perfume or fragrance or an odoriferous active ingredient. There are no compositions comprising an elastomeric phase according to the invention.

Furthermore this microcapsule and water soluble copolymers are usually handled and formulated in aqueous phase and systems. The capsules are deposed on the surface of other materials. The capsules are sensible to mechanical stress. This make there use very limited.

BRIEF DESCRIPTION OF THE INVENTION

Surprisingly is has been discovered that an composition comprising an elastomeric phase of macromolecular sequences having a flexible nature with a glass transition temperature of less than 20° C. and at least one active ingredient as odoriferous active compound which is an organic molecule having a molecular weight of at least 16 g/mol and an odour threshold value in air of at least 0.5 ppb provides a polymeric composition with an odor.

It has also been found that an composition comprising an elastomeric phase of macromolecular sequences having a flexible nature with a glass transition temperature of less than 20° C. and at least one active ingredient as odoriferous active compound which is an organic molecule having a molecular weight of at least 16 g/mol and an odour threshold value in air of at least 0.5 ppb provides polymeric composition with an odour that can be scented for an extended length of time.

DETAILED DESCRIPTION OF THE INVENTION

According to a first aspect, the present invention relates to a composition comprising
- an elastomeric phase of macromolecular sequences having a flexible nature with a glass transition temperature of less than 20° C. and
- at least one active ingredient as odoriferous active compound which is an organic molecule having a molecular weight of at least 16 g/mol and an odour threshold value in air of at least 0.5 ppb.

According to another aspect the present invention relates to an article made from a composition comprising
- an elastomeric phase of macromolecular sequences having a flexible nature with a glass transition temperature of less than 20° C. and
- at least one active ingredient as odoriferous active compound which is an organic molecule having a molecular weight of at least 16 g/mol and an odour threshold value in air of at least 0.5 ppb.

Still another aspect of the present invention is the use of a composition comprising
- an elastomeric phase of macromolecular sequences having a flexible nature with a glass transition temperature of less than 20° C. and
- at least one active ingredient as odoriferous active compound which is an organic molecule having a molecular weight of at least 16 g/mol and an odour threshold value in air of at least 0.5 ppb for preparation of articles.

An additional aspect of the present invention is the method for preparation of a composition comprising
- an elastomeric phase of macromolecular sequences having a flexible nature with a glass transition temperature of less than 20° C. and
- at least one active ingredient as odoriferous active compound which is an organic molecule having a molecular weight of at least 16 g/mol and an odour threshold value in air of at least 0.5 ppb By the term "polymeric elastomeric phase" as used is denoted the thermodynamic state of the polymer above its glass transition.

By the term "alkyl(meth)acrylate" as used is denoted the to both alkyl acrylate and alkyl methacrylate.

By the term "copolymer" as used is denoted that the polymers consists of at least two different monomers.

By the term "parts" as used herein is denoted "parts by weight".

By the term "thermoplastic polymer" as used is denoted a polymer that turns to a liquid or becomes more liquid or less viscous when heated and that can take on new shapes by the application of heat and pressure.

By the term "PMMA" as used are denoted homo- and copolymers of methylmethacrylate (MMA), for the copolymer of MMA the weight ratio of MMA inside the PMMA is at least 50 wt %.

Odoriferous active compounds are generally small molecular weight substances with a vapour pressure that allows their molecules to evaporate, become airborne, and eventually reach the olfactory organ of a living entity. There are a variety of different odoriferous active compounds with different functional groups and molecular weights, both of which affect their vapour pressures, and hence, the ease with which they can be sensed.

With regard to elastomeric phase of macromolecular sequences having a flexible nature, said macromolecular sequences have a glass transition temperature of less than 20° C., preferably less than 10° C. and more preferably less than 0° C. and advantageously less the −10° C.

The elastomeric phase in the composition according to the invention can be a continuous phase, a semi-continuous or a discontinuous phase.

Preferably the macromolecular sequence with the flexible nature forming the elastomeric phase is part of a block copolymer with at least one block having a glass transition temperature less than 20° C. preferably less than 10° C. and more preferably less than 0° C. and advantageously less the −10° C.

The glass transition temperature Tg of the elastomeric phase is measured according ISO 11357-2/2013.

The block copolymer can be chosen from a thermoplastic block copolymer.

Advantageously the block copolymer is amorphous. By amorphous is meant that the block copolymer that has a melting enthalpy AH of at most 3 J/g and more preferably at most 1 J/g as measured with dynamic differential calorimetry (differential scanning calorimetry, DSC) according to ISO 11357-3/2011 at a heating rate of 20 K/min. More advantageously the block copolymer does not comprise any semicrystalline or crystalline blocks.

Most preferably the thermoplastic block copolymer is a thermoplastic acrylic block copolymer. By this is meant that at least 50 wt % of the monomers inside thermoplastic acrylic block copolymer the are alkyl(meth)acrylate monomers.

The thermoplastic acrylic block copolymer is having a general formula $(A)_nB$ in which:
- n is an integer of greater than or equal to 1,
- A is: an acrylic or methacrylic homo- or copolymer having a Tg of greater than 50° C., preferably of greater than 80° C., or polystyrene, or an acrylic/styrene or methacrylic/styrene copolymer. Preferably, A is chosen from methyl methacrylate (MMA), phenyl methacrylate, benzyl methacrylate or isobornyl methacrylate. Preferably, the block A is PMMA or PMMA modified with acrylic or methacrylic comonomers;
- B is an acrylic or methacrylic homo- or copolymer having a Tg of less than 20° C., preferably comprising monomers chosen of methyl acrylate, ethyl acrylate, butyl acrylate (BuA), ethylhexyl acrylate or butyl methacrylate, more preferably butyl acrylate said monomers make up at least 20 wt %, preferably 50 wt %, more preferably 70 wt % of B.

Advantageously the block copolymer is amorphous. By amorphous is meant that the block copolymer that has a melting enthalpy AH of at most 3 J/g and more preferably at most 1 J/g as measured with dynamic differential calorimetry (differential scanning calorimetry, DSC) according to ISO 11357-3/2011 at a heating rate of 20 K/min and advantageously no melting point as measured by DSC.

The glass transition temperature Tg of the respective blocks of the block copolymer is measured according ISO 11357-2/2013.

Furthermore, the blocks A and/or B can comprise other acrylic or methacrylic comonomers carrying various chemical function groups known to a person skilled in the art, for example acid, amide, amine, hydroxyl, epoxy or alkoxy functional groups. The block A can incorporate groups, such as acrylic acid or methacrylic acid, in order to increase the temperature stability of thereof.

Furthermore the block B can comprise also styrene as a comonomer.

The quantity of the methacrylic comonomers carrying various chemical function groups introduced in the block A and/or B does not make the blockcopolymer water soluble. Preferably the thermoplastic acrylic block copolymer is not soluble in water. This means that the water solubility of the block copolymer is less than 0.5 g/l.

Preferably, said thermoplastic acrylic block copolymer has a structure chosen from: ABA, AB, $A_3B$ and $A_4B$.

The thermoplastic acrylic block copolymer for example can be one of the following triblock copolymers: pMMA-pBuA-pMMA, p(MMAcoMAA)-pBuA-p(MMAcoMAA) and p(MMAcoAA)-pBuA-p(MMAcoAA). In a preferred embodiment, the block copolymer is of MAM type (PMMA-pBuA-PMMA).

It is known to a person skilled in the art that the polymers of PMMA type can comprise small amounts of acrylate comonomer in order to improve the temperature stability thereof.

The block B represents from 10% to 85%, preferably 25% to 75% of the total weight of the block copolymer, more preferably from 40% to 65%.

The block B has a weight-average molar mass of between 10,000 g/mol and 500,000 g/mol, preferably from 20,000 g/mol to 300,000 g/mol. The weight average molar mass can be measured by size exclusion chromatography (SEC).

The block copolymers participating in the composition of the matrix can be obtained by controlled radical polymerization (CRP) or by anionic polymerization; the most suitable process according to the type of copolymer to be manufactured will be chosen.

Preferably, this will be CRP, in particular in the presence of nitroxides, for the block copolymers of $(A)_nB$ type and anionic or nitroxide radical polymerization, for the structures of ABA type, such as the triblock copolymer MAM. Controlled radical polymerization is described in the document for obtaining block copolymers is described in the document WO03/062293.

With regard to the active ingredient or odoriferous active compound of the composition according to the invention is an organic molecule. The organic molecule is an odorant molecule.

The organic molecule that is the odorant molecule and can be in one sense of the invention considered to be a material like a fragrance, perfume, aroma or flavour. However these are materials that are generally connected with a smell or scent that could be considered as pleasant. According the invention the organic molecule that is the odorant molecule can also have an unpleasant smell like for example an organic amine compound or an organic thiol compound.

The molecular weight M of the organic molecule that is the active ingredient is at least 16 g/mol, preferably at least 30 g/mol.

The odour threshold value in air of the organic molecule that is the active ingredient is at least 0.5 ppb.

Generally the organic molecule as active ingredient or odoriferous active has chemical groups as varied as alcohols, ketones, esters, ethers, acetates, alkenes, carboxylic acids, amines, lactones, aromatics, thio groups. The organic molecule can comprise only one or several of this chemical groups.

The organic molecule can for example be chosen from but is not limited to ethyl formate, ethyl acetoacetate, ethyl acetate, diethyl malonate, fructone, ethyl propionate, toluic aldehyde, leaf aldehyde, trans-2-hexenal, trans-2-hexenol, cis-3-hexenol, prenyl acetate, ethyl butyrate, hexanal, butyl acetate, 2-phenylpropanal, cis-4-heptenal, cis-3-hexenyl formate, propyl butyrate, amyl acetate, ethyl-2-methylbutyrate, ethyl amyl ketone, hexyl formate, 3-phenyl butanal, cis-3-hexenyl methyl carbonate, methyl phenyl carbinyl acetate, methyl hexyl ether, methyl cyclopentylidene acetate, 1-octen-3-ol, cis-3-hexenyl acetate, amyl vinyl carbinol, 2,4-dimethyl-3-cyclohexen-1-carbaldehyde, ethyl 2-methyl-pentanoate, 1,3,3-trimethyl-2-oxabicyclo[2.2.2]octane, 3,7-dimethyl-7-methoxyoctan-2-ol, methyl anthranylate, nerolidyl acetate, para-cresyl caprylate, para-cresyl, phenyl acetate, phenyl ethyl cinnamate, phenyl ethyl salicylate, tetradecariitrile, 2-methyl pyrazine, acetaldehyde phenyl-ethyl propyl acetal, acetophenone, nonenylic aidhyde, allyl amyl glycolate, allyl caproate, amyl butyrate, aldehyde anisique, benzaldehyde, benzyl acetate, benzyl acetone, benzyl alcohol, benzyl butyrate, benzyl formate, benzyl iso-valerate, benzyl methyl ether, berizyl propionate, butyl acetate, camphor, 3-methyl-5-propyl-2-cyclohexenone, cinnamic aldehyde, cis-3-hexenol, cis-3-hexenyl acetate, cis-3-hexenyl formate, cis-3-hexenyl iso-butyrate, cis-3-hexenyl propionate, cis-3-hexenyl tiglate, citronella!, citronellol, citronellyl nitrile, 2-hydroxy-3-methyl-2-cyclopenten-1-one, cuminic aldehyde, acetic acid (cycloheyloxy)-2-propenylester, damascenone, aipha-damascone, beta-daniascone, decahydro beta-napthyl formate, dietliyl inalonate, dihydro-jasmone, dihydro-linalool, dihydro-myrcenol, dihydro-terpineol, dimethyl anthranilate, dimethyl benzyl carbinol, dimethyl benzy! carbinyl acetate, dimethyl octenone, dimyrcetol, estragole, ethy! acetate, ethyl aceto-acetate, ethyl benzoate, ethyl heptoate, ethyl linalool, ethyl salicylate, ethyl-2-methyl butyrate, eucalyptol, eugenol, fenchyl acetate, fenchyl alcohol, 4-phenyl-2,4,6-trimethyl 1,3-dioxane, methyl 2-octynoate, 4-isopropylcyclohexanol, 2-sec-butylcyclohexanone, styralyl acetate, geranyl nitrile, hexyl acetate, alpha-ionone, iso-amyl acetate, iso-butyl acetate, iso-cyclocitral, dihydroisoj asmone, iso-menthone, iso-pentyrate, iso-pulegol, cis-jasmone, laevo-carvone, phenylacetaldehyde glycerylacetal, carbinic acid 3-hexenyl methyl ether, 1-methyl-cyclohexa-1,3-diene, linalool, linalool oxide, 2-ethylethyl ester pentanoate, 2,6-dimethyl-5-heptenal, menthol, menthone, methyl acetophenone, methyl amyl ketone, methyl benzoate, alpha-methyl cinnamic aldehyde, methyl heptenone, methyl hexyl ketone, methyl para cresol, methyl phenyl acetate, methyl salicylate, 4-tert-pentyl-cyclohexanone, para-creso, para-cresyl acetate, para-t-butyl-cyclohexanone, para-toluyl aldehyde, phenyl acetaldehyde, phenyl ethyl acetate, phenyl ethyl alcohol, phenyl ethyl butyrate, phenyl ethyl formate, phenyl ethyl iso butyrate, pheny ethyl propionate, phenyl propyl acetate, pheny! propyl aldehyde, tetrahydro-2,4-dimethyl-4-pentyl-furan, 4-methy!-2-(2-methyl-1-propenyl)tetrahydropyran, 5-Methyl-3-heptanone oxime, styralyl propionate, styrene, 4-methylphenylacetaldehyde, terpineol, terpinolene, tetrahydro-linalool, tetrahydro-rnyrcenol, trans-2-hexenal, verdyl acetate, methyl anthranilate, 4-Hydroxy-3-methoxybenzaldehyde, 4-(4-Hydroxyphenyl) butan-2-one or mixtures thereof.

The organic molecule that is the active ingredient is not an organic molecule coming from the other components of the composition. By this is meant that it is not a residual monomer introduced in the composition with the thermoplastic polymer or for example with the block copolymer for the elastomeric domains. If the thermoplastic polymer is for example polystyrene, the residual styrene monomer is not considered as active ingredient according to the invention. If the elastomeric domains comprises for example polybutylacrylate blocks, the residual butyl acrylate monomer is not considered as active ingredient according to the invention.

The composition according to the invention comprises from 1 ppm to 10 wt % of the organic molecule as active ingredient or odoriferous active compound, preferably from 5 ppm to 5 wt %, more preferably from 10 ppm to 5 wt %.

The elastomeric phase of the composition makes up at least 1 wt %.

According to a further aspect the composition according to the invention can comprise a further polymer P.

According to one embodiment the composition of the present invention can comprise also at least one additional polymer P, said polymer P makes up less than 50 wt % of the composition.

According to another embodiment the composition of the present invention can be comprised in at least one polymer P, said polymer P makes up at least 50 wt % of the composition With regard to the polymer P, it is preferably a thermoplastic polymer or a crosslinked polymer comprising thermoplastic polymer chains between the cross linking points.

The thermoplastic polymer is chosen from poly(vinyl chloride) (PVC), polyesters as for example poly (ethylene terephtalate) (PET) or poly(butylene terephtalate) (PBT) or polylactic acid (PLA), polystyrene (PS), polycarbonates (PC), polyethylene, poly (methyl methacrylate)s, (meth) acrylic copolymers, thermoplastic poly(methyl methacrylate-co-ethylacrylates), poly(alkylene-terephtalates), poly vinylidene fluoride, poly(vinylidenchloride), polyoxymethylen (POM), semi-crystalline polyamides, amorphous polyamides, semi-crystalline copolyamides, amorphous copolyamides, polyetheramides, polyesteramides, copolymers of styrene and acrylonitrile (SAN), and their respective mixtures.

The polymeric polymer can also be a blend of several thermoplastic polymers.

Preferably the thermoplastic polymer is a methacrylic polymer.

Preferably the thermoplastic polymer is a methacrylic polymer comprising at least 50 wt % methyl methacrylate.

A method of preparation of a composition according to the invention comprises a blending step of the respective compounds.

A method of preparation of the composition according to the invention is blending a component comprising the elastomeric phase of macromolecular sequences having a flexible nature with the active ingredient as odoriferous active compound.

The two components could be heated if necessary during blending

Mixing could also be obtained by dry blending a solid resin comprising the elastomeric phase of macromolecular sequences having a flexible nature and solid active ingredient as odoriferous active compound.

The composition according to the invention can be transformed by injection molding, extrusion, coextrusion or extrusion/blow molding for the preparation of parts, profiled elements, sheets or films, for example, or for producing an article.

The articles of the invention can for example be in form of a sheet, block, film, tube or profiled element.

Another method of preparation of a composition according to the invention comprises the steps of mixing the at least one active ingredient as odoriferous active compound with at least one monomer and macromolecular sequences having a flexible nature followed by a polymerisation step.

An example for this method for preparation of a composition according to the invention would be a cast sheet polymerization wherein the active ingredient as odoriferous active compound is mixed with the monomer or monomers and the other ingredients before the polymerization. Such a method without adding the active ingredient as odoriferous active compound is described to WO2012/085487.

The articles according to the invention can be transparent including a non transparent object.

One example for an article in form of a block would be and block made of the composition according to the invention comprising a transparent PMMA comprising elastomeric domains and including a rose, the object diffusing the smell of a rose, due to the addition of a fragrance having the smell of a rose before polymerisation.

Another article would be a point of sale for perfumes made of transparent PMMA.

The weight average molecular weight of polymeric compound can be measure by size exclusion chromatography (SEC).

The glass transition temperature (Tg) of the polymers are measured with equipment able to realize a thermo mechanical analysis. A RDAII "RHEOMETRICS DYNAMIC ANALYSER" proposed by the Rheometrics Company has been used. The thermo mechanical analysis measures precisely the visco-elastics changes of a sample in function of the temperature, the strain or the deformation applied. The apparatus records continuously, the sample deformation, keeping the stain fixed, during a controlled program of temperature variation.

The results are obtained by drawing, in function of the temperature, the elastic modulus (G'), the loss modulus and the tan delta. The Tg is higher temperature value read in the tan delta curve, when the derived of tan delta is equal to zero.

EXAMPLES

The first series of examples concern the preparation of PMMA sheets comprising an active ingredient (odoriferous active compound). One sheet comprises elastomeric domains the comparative sheet does not comprise elastomeric domains. The PMMA sheets are prepared by cast polymerization of MMA. The sheet comprising the elastomeric domains is prepared according to WO2012/085487.

Example 1

A solution is prepared in a glass flask of 1 litre of 67.4 g of solution of Flexibloc CS (reactive block copolymer comprising an elastomeric block, commercialized by ARKEMA), 365 g methyl methacrylate, 2.5 g butanediol dimethacrylate, 0.306 g of VAZO 88 (radical initiator commercialized by DuPont), 0.45 g of Tinuvin B3018FF (CIBA/BASF) and 4.5 g of methyl anthranylate (as odoriferous active compound). This solution is agitated for 30 minutes.

The solution is devolatilized under reduced pressure of 200 mbar for 15 minutes. The reduced pressure is controlled in such a way that the dissolved gasses are volatilized, but at the sale time the evaporation of the monomer is avoided or low.

This devolatilized solution is introduced in a mould consisting of two glass sheets (10 mm thickness and 30 cm×30 cm) separated by a gasket ring of plasticized PVC of 5 mm diameter, all equipment usually used in the preparation of cast moulded sheets and well known by one skilled in the art. The ensemble is hold together by metal clamps distributed around the edge of the mould.

The mould is closed and introduced at an air mixing ventilated oven. A first cycle of a temperature of 70° C. is kept during 16 hours, followed by increasing the temperature at 125° C. during 2 hours, keeping the temperature at 125° C. during 1 hour and decrease at a temperature of 30° C. during 1 hour.

The mould is disassembled and a PMMA sheet with a characteristic odor is obtained. The odor is still there after 4 weeks.

Comparative Example 1

A solution is prepared in a glass flask of 1 litre of 434 g methyl methacrylate, 0.147 g of VAZO 88 (radical initiator commercialized by DuPont), 0.016 g terpinolene, 0.135 g of Tinuvin B3018FF (CIBA/BASF) and 4.5 g of methyl anthranylate (as odoriferous active compound). This solution is agitated for 30 minutes.

The devolatilization and cast sheet mould polymerization are performed as in example 1.

No odor at all is detected, not even directly after the disassembling of the mould.

The second series of examples concern the preparation of sheets of PMMA and of composition with elastomeric phase of macromolecular sequences, both comprising an active ingredient (odoriferous active compound). One sheet comprises elastomeric domains the comparative sheet does not comprise elastomeric domains. The sheets are prepared by molding in a press the composition obtained befotre by blending.

Example 2

59.4 g of an acrylic blockcopolymer PMMA-pBuA-PMMA (Nanostrenth M53 from ARKEMA) having in the middle a block of polybutylacryate (Mw=55000 g/mol) and at each side a block of polymethylmethacrylate is blended with 0.6 g vanillin (4-Hydroxy-3-methoxybenzaldehyde) at 130° C. in a HAAKE RHEOMIX 600 during 10 min at a rotor speed of 40 rpm. The mixture is recoverd still hot and sheets are pressed in a mold at 150° C. The obtained sheet has the characteristic odor of vanillin.

Comparative Example 2

59.4 g of PMMA (having a meltflow rate of 3.7 (230° C./3.8 kg ASTM D1238) is blended with 0.6 g vanillin (4-Hydroxy-3-methoxybenzaldehyde) at 190° C. in a HAAKE RHEOMIX 600 during 10 min at a rotor speed of 40 rpm. The mixture is recoverd still hot and sheets are pressed in a mold at 200° C.
The obtained sheet has no characteristic odor of vanillin.

Example 3

Example 2 is repeated while using frambinone (4-(4-Hydroxyphenyl) butan-2-one) instead of vanillin.
The obtained sheet has the characteristic odor of frambinone.

Comparative Example 3

Comparative Example 3 is repeated while using frambinone (4-(4-Hydroxyphenyl)butan-2-one) instead of vanillin. The obtained sheet has no characteristic odor of frambinone.

The invention claimed is:

1. A composition, comprising:
   an elastomeric phase of macromolecular sequences having a flexible nature with a glass transition temperature of less than 20° C., wherein the elastomeric phase of macromolecular sequences is formed from blocks of a block copolymer which is amorphous; and
   at least one active ingredient as odoriferous active compound which is an organic molecule having a molecular weight of at least 16 g/mol and an odour threshold value in air of at least 0.5 ppb,
   wherein the block copolymer has a water solubility of less than 0.5 g/l.
2. A composition according to claim 1, wherein said block copolymer does not comprise any semicrystalline or crystalline blocks.
3. A composition according to claim 1, wherein said elastomeric phase of macromolecular sequences is formed from blocks of an acrylic block copolymer.
4. A composition according to claim 3, wherein said acrylic block copolymer has a general formula $(A)_n B$ in which:
   n is an integer of greater than or equal to 1,
   A is: an acrylic or methacrylic homo- or copolymer having a Tg of greater than 50° C., or polystyrene, or an acrylic/styrene or methacrylic/styrene copolymer; and
   B is an acrylic or methacrylic homo- or copolymer having a Tg of less than 20° C.
5. A composition according to claim 1, wherein the macromolecular sequences of said elastomeric phase have a weight average molecular weight of between 10,000 g/mol and 500,000 g/mol.
6. A composition according to claim 1, wherein the at least one active ingredient as odoriferous active compound is present from 1 ppm to 10 wt %.
7. A composition according to claim 1, wherein the elastomeric phase of the composition makes up at least 1 wt % of the composition.
8. A composition according to claim 1, wherein the composition comprises a further polymer P.
9. A composition according to claim 8, wherein said further polymer P is a thermoplastic polymer.
10. A method of preparing a composition according to claim 1 comprising blending the elastomeric phase of macromolecular sequences and the at least one active ingredient as odoriferous active compound.
11. A method of preparing a composition according to claim 1, comprising the steps of mixing the at least one active ingredient as odoriferous active compound with at least one monomer and macromolecular sequences having a flexible nature followed by a polymerisation step.
12. An article comprising a composition according to claim 1.
13. An article according to claim 12 in form of a sheet, block, film, tube or profiled element.
14. A method for making an article, comprising using a composition according to claim 1.
15. A composition according to claim 4, wherein A is a homo- or copolymer comprised of one or more monomers selected from the group consisting of methyl methacrylate (MMA), phenyl methacrylate, benzyl methacrylate and isobornyl methacrylate.
16. A composition according to claim 4, wherein A is selected from the group consisting of PMMA and PMMA modified with acrylic or methacrylic comonomers.
17. A composition according to claim 4, wherein B is an acrylic or methacrylic homo- or copolymer comprising monomers selected from the group consisting of methyl acrylate, ethyl acrylate, butyl acrylate (BuA), ethylhexyl acrylate and butyl methacrylate.
18. A composition according to claim 4, wherein B is an acrylic or methacrylic homo- or copolymer comprising butyl acrylate (BuA).
19. A composition according to claim 17, wherein said monomers make up at least 20 wt % of B.
20. A composition according to claim 1, wherein the elastomeric phase of the macromolecular sequences has a glass transition temperature of less than 10° C.

* * * * *